Patented Apr. 7, 1936

2,036,304

UNITED STATES PATENT OFFICE 2,036,304

FORMALS OF ALIPHATIC PARTIAL ETHERS OF POLYHYDRIC ALCOHOLS AND METHOD OF MAKING THE SAME

George W. Seymour, Cumberland, Md., assignor to Celanese Corporation of America, a corporation of Delaware No Drawing. Original application August 23, 1932, Serial No. 630,062. Divided and this application April 16, 1934, Serial No. 720,815. In Canada August 7, 1933

5 Claims. (Cl. 260—151)

This application is a division of my application No. 630,062 filed August 23, 1932.

This invention relates to solvents for cellulose acetate and other derivatives of cellulose and relates to methods and compositions wherein such solvent is employed.

An object of my invention is to produce a new solvent for cellulose acetate or other derivatives of cellulose. Another object of my invention is to employ the formals of partial ethers of polyhydric alcohols as solvents for cellulose acetate or other organic derivatives of cellulose in various processes and for various compositions. Other objects of this invention will appear from the following detailed description.

As is well known, the number of substances that are solvents for cellulose acetate, especially the acetone-soluble type of cellulose acetate, is very limited. Because of the small range of these solvents, it is often difficult and even impossible to find a solvent that meets with the particular requirements of a given problem, such as boiling point, compatibility or mutual solubility with other solvents, resins or other ingredients present in the cellulose acetate composition in which it is employed, cheapness, availability, etc. This is particularly true in the case of high or medium boiling solvents for cellulose acetate.

I have found that the formals of the partial ethers of polyhydric alcohols are excellent solvents for cellulose acetate, particularly the acetone-soluble cellulose acetate, and other organic derivatives of cellulose, and may be employed in all compositions and processes wherein cellulose acetate is to be dissolved.

The formals of the partial ethers of polyhydric alcohols may be considered as the methylene ethers of polyhydric alcohols in which hydrogen of at least one of the hydroxy groups has been substituted by an alkyl, aryl or aralkyl group, and may be represented by the probable general formula

RO(CH₂)ₙOCH₂O(CH₂)ₙ'OR' wherein R and R' may be the same or different alkyl, aryl or aralkyl groups, and $n$ and $n'$ may be the same different integers.

These formals may be prepared by the condensation of formaldehyde, formalin, trihydroxymethylene or para-formaldehyde with the partial ethers of a polyhydric alcohol in the presence of an acidic catalyst such as ferric chloride or other acid salts, hydrochloric acid, sulfuric acid, phosphoric acid or other strong or weak mineral acids. Any suitable partial ether of a polyhydric alcohol may be employed for preparing these formals, examples of which are the monomethyl ether of ethylene glycol, the monomethyl ether of ethylene glycol and the monomethyl or ethyl ether of propylene glycol or of diethylene glycol.

The term "formal" is herein employed to denote compounds obtainable by the condensation of formaldehyde, with the partial ethers of polyhydric alcohols. The term "formaldehyde" is to be construed as covering also substances which are obvious chemical equivalents of formaldehyde, such as formalin, trihydroxymethylene and para-formaldehyde.

The following method of preparing the formal of the monomethyl ether of ethylene glycol is illustrative of the method of preparing these formals.

Two (2) molecular proportions of the monomethyl ether of ethylene glycol, CH₃OCH₂CH₂OH, one (1) molecular proportion of para-formaldehyde and hydrated ferric chloride (in amount equal to 4% of the weight of the reactants) are subjected to slow distillation. The distillate is collected in three fractions, namely at temperatures from 92 to 110° C., from 110 to 180° C. and from 180 to 200° C. Calcium chloride is added to the first two fractions and the upper layers thereof are added to the third fraction and the mixture is then redistilled. The fraction boiling at 197° C. to 205° C. is collected, and this is a formal which is probably represented by the formula (CH₃OCH₂CH₂O)₂CH₂

As stated, these formals may be used wherever it is desired to dissolve partially or wholly derivatives of cellulose, such as cellulose nitrate but particularly the organic derivatives of cellulose such as organic esters of cellulose and cellulose ethers. Examples of organic esters of cellulose are cellulose acetate, cellulose formate, cellulose butyrate, while examples of cellulose ethers are ethyl cellulose, methyl cellulose and benzyl cellulose.

A few of the many instances of the use of these formals will be given.

These formals may be employed alone or in conjunction with low boiling, medium, or high boiling solvents, resins both natural and synthetic, plasticizers or other desired ingredients to prepare coating compositions or dopes containing cellulose acetate or other organic derivatives of cellulose, which coating compositions may be employed for coating fabrics, wood and the like, or as lacquers containing suitable natural or synthetic resins, to be applied to metallic or other smooth surfaces. Dopes containing the cellulose acetate dissolved in a solvent comprising these formals may be cast on to smooth surfaces such as film bands, wheels and the like, to form upon evaporation of the solvent, films which may be used for photographic purposes, or thin foils to be employed as transparent wrappings for packages of foodstuffs, tobacco products and other articles of commerce.

Plastic compositions containing organic derivatives of cellulose, plasticizers and other desired ingredients may be made by the use of these formals as at least part of the solvent during the kneading of the mass and subsequent working up of the same on heated malaxating rolls.

If desired besides the formals, other solvents may be used in addition thereto, such as low boiling solvents like acetone, ethylene dichloride and the like, and medium and/or high boiling solvents such as ethyl acetate, ethyl lactate, tetrachorethane or diacetone alcohol. Examples of plasticizers for cellulose acetate are diphenylol propane, triacetin, dibutyl tartrate, diethyl phthalate, monomethylene xylene sulfonamide, triphenyl phosphate, etc.

It is to be understood that the foregoing description is given merely by way of illustration and that many variations may be made therein without departing from the spirit of my invention.

Having described my invention, what I desire to secure by Letters Patent is:

1. As a new product a compound having the general formula $$RO(CH_2)_nOCH_2O(CH_2)_{n'}OR'$$

wherein R and R' are the same or different alkyl groups and $n$ and $n'$ are the same or different integers.

2. As a new product the formal of the monomethyl ether of ethylene glycol.

3. As a new product, the formal of an aliphatic partial ether of a polyhydric alcohol.

4. Method of preparing formals of partial ethers of polyhydric alcohols comprising condensing formaldehyde with an aliphatic partial ether of a polyhydric alcohol in the presence of an acidic condensing agent.

5. Method of preparing a formal of the monomethyl ether of ethylene glycol comprising condensing mono methyl ether of ethylene glycol with formaldehyde in the presence of an acidic condensing agent.

GEORGE W. SEYMOUR.

CERTIFICATE OF CORRECTION.

Patent No. 2,036,304. April 7, 1936.

GEORGE W. SEYMOUR.

It is hereby certified that error appears in the printed specification of the above numbered patent requiring correction as follows: Page 1, first column, line 48, after "same", insert or; and that the said Letters Patent should be read with this correction therein that the same may conform to the record of the case in the Patent Office.

Signed and sealed this 12th day of May, A. D. 1936.

Leslie Frazer (Seal) Acting Commissioner of Patents.